(12) United States Patent
Kumar et al.

(10) Patent No.: US 8,506,340 B1
(45) Date of Patent: Aug. 13, 2013

(54) SYSTEM AND METHOD FOR RETROFITTING AN EXISTING LAMP FOR REMOTE OPERATION

(75) Inventors: Russikesh Kumar, Ridgewood, NJ (US); Evan Robert Ackmann, Hoboken, NJ (US); Doug Jacobson, Oradell, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 13/548,439

(22) Filed: Jul. 13, 2012

(51) Int. Cl.
*H01J 17/49* (2012.01)
*H01J 1/62* (2006.01)
*H01J 63/04* (2006.01)

(52) U.S. Cl.
USPC .................................. 445/2; 445/1; 313/483

(58) Field of Classification Search
None
See application file for complete search history.

(56) References Cited

U.S. PATENT DOCUMENTS

| 6,847,291 | B2 * | 1/2005 | Kemp | 340/521 |
| 7,520,628 | B1 * | 4/2009 | Sloan et al. | 362/101 |
| 2002/0083767 | A1 * | 7/2002 | Kemp | 73/292 |
| 2002/0084699 | A1 * | 7/2002 | Kemp | 307/112 |

* cited by examiner

*Primary Examiner* — Natalie Walford
(74) *Attorney, Agent, or Firm* — Crestron Electronics Inc.

(57) ABSTRACT

Presented is a method for retrofitting an electric lamp having an electric switch with a dimmer unit. The method includes providing a dimmer unit configured for dimming the electric lamp. The dimmer unit includes a microcontroller, and a lamp switch connector socket in electrical communication with the microcontroller. The method further includes providing a lamp switch connector, electrically disconnecting the electric switch from the electric lamp, electrically connecting the electric switch to the lamp switch connector, and electrically connecting the lamp switch connector to the lamp switch connector socket. Consequently, the electric switch is functionally isolated from the lamp and in electrical communication microcontroller.

17 Claims, 5 Drawing Sheets

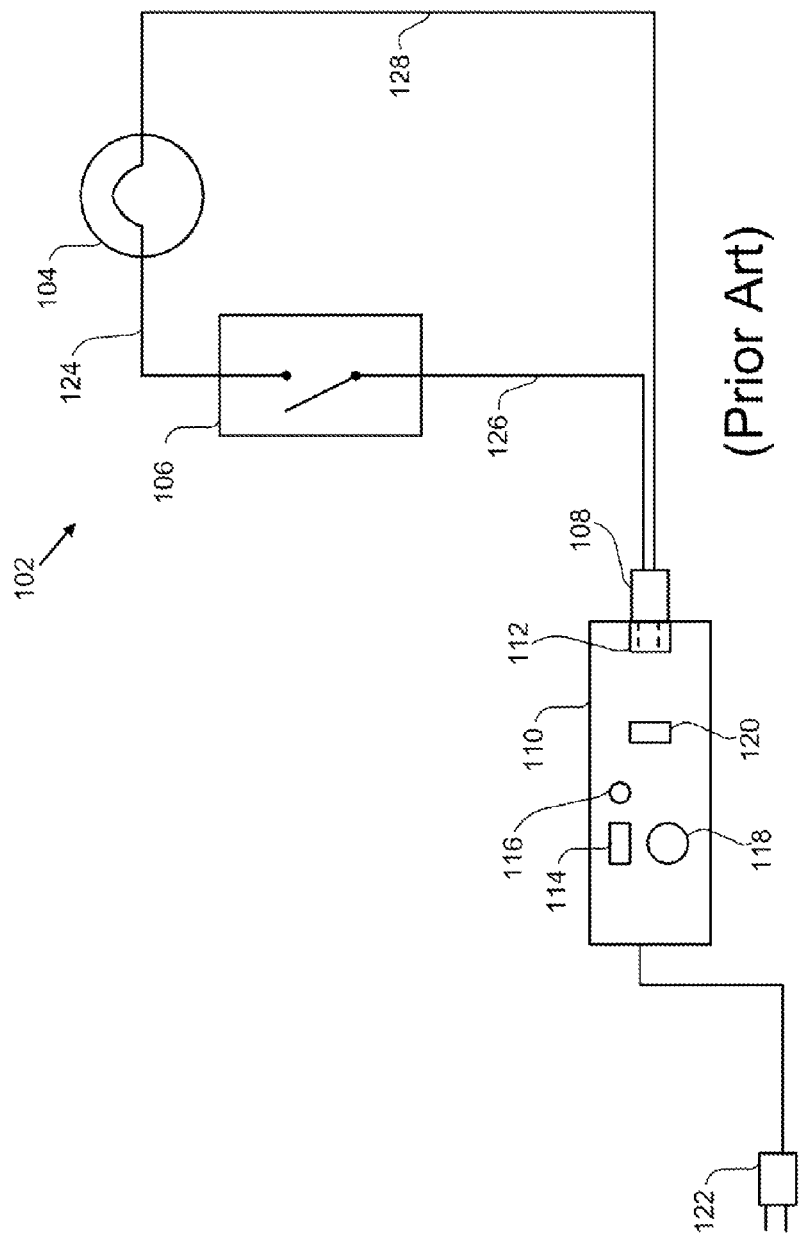

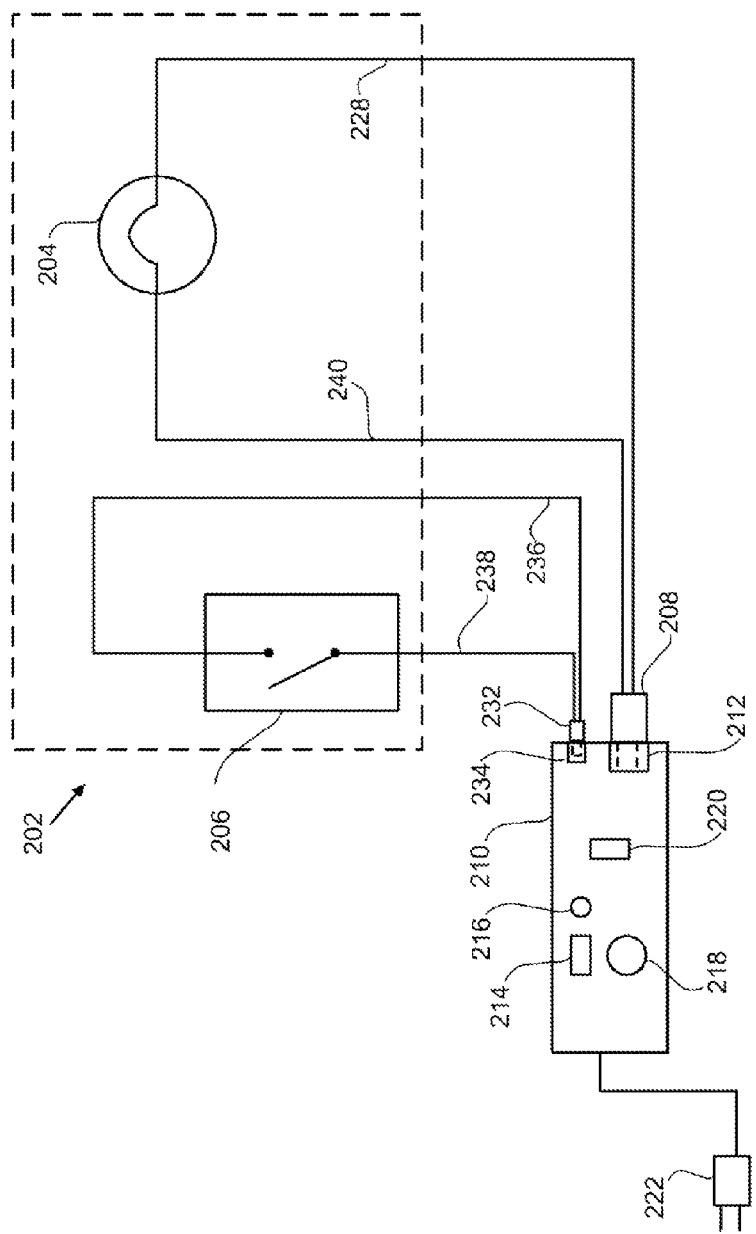

SYSTEM AND METHOD FOR RETROFITTING AN EXISTING LAMP FOR REMOTE OPERATION

BACKGROUND OF THE INVENTION

1. Technical Field

The present disclosure relates generally to lamp controllers, and more particularly to retrofitting an existing non-dimmable lamp with a controller that enables the lamp to be remotely dimmed and/or remotely turned on or off regardless of the state of the lamp's native on/off switch.

2. Background Art

Existing external lamp controllers are used to remotely control (i.e., dim, turn on/off) lamps that include only a simple on/off switch. In operation, a lamp that includes only a simple on/off switch is plugged into the external lamp controller, which is, in turn, plugged into an AC outlet. In this configuration, the on/off switch of the lamp must remain on, and power to the lamp is controlled by the external lamp controller. A user dims the lamp or turns the lamp on/off via a switch on the external lamp controller or via a remote control in communication with the external lamp controller. If, however, a user inadvertently turns the lamp off via the on/off switch on the lamp, the user cannot thereafter control the lamp via the external lamp controller until the switch on the lamp is switched to the "on" position.

Therefore, a need exists for an external lamp controller that, when connected to a lamp with a simple on/off switch, either bypasses the lamp on/off switch completely or incorporates the electrical connections of the lamp on/off switch into the operation of the external lamp controller.

SUMMARY OF THE INVENTION

It is to be understood that both the general and detailed descriptions that follow are exemplary and explanatory only and are not restrictive of the invention.

According to one aspect, the disclosure involves a method for retrofitting an electric lamp having an electric switch with a dimmer unit. The method includes providing a dimmer unit configured for dimming the electric lamp. The dimmer unit includes a microcontroller, and a lamp switch connector socket in electrical communication with the microcontroller. The method further includes providing a lamp switch connector, electrically disconnecting the electric switch from the electric lamp, electrically connecting the electric switch to the lamp switch connector, and electrically connecting the lamp switch connector to the lamp switch connector socket thereby functionally isolating the electric switch from the lamp and electrically connecting the electric switch to the microcontroller.

According to another aspect, the disclosure involves a system for retrofitting an electric lamp having an electric switch with a dimmer unit. The system includes a dimmer unit configured for dimming the electric lamp. The dimmer unit includes a microcontroller, and a lamp switch connector socket in electrical communication with the microcontroller. The system further includes a lamp switch connector configured for electrically connecting to the lamp switch connector socket and configured for electrically connecting to the electric switch and thereby functionally isolating the electric switch from the lamp and electrically connecting the electric switch to the microcontroller.

BRIEF DESCRIPTION OF THE DRAWINGS

The accompanying figures further illustrate the present invention. Exemplary embodiments are illustrated in reference figures of the drawings. It is intended that the embodiments and figures disclosed herein are to be considered illustrative rather than limiting.

The components in the drawings are not necessarily drawn to scale, emphasis instead being placed upon clearly illustrating the principles of the present invention. In the drawings, like reference numerals designate corresponding parts throughout the several views.

FIG. 1 is an illustrative schematic diagram of a prior art electric lamp in electrical communication with an external lamp controller.

FIG. 3 is an illustrative schematic diagram of the electric lamp retrofitted with the external lamp controller of FIG. 2.

LIST OF REFERENCE NUMBERS FOR THE MAJOR ELEMENTS IN THE DRAWING

Figure 2A:
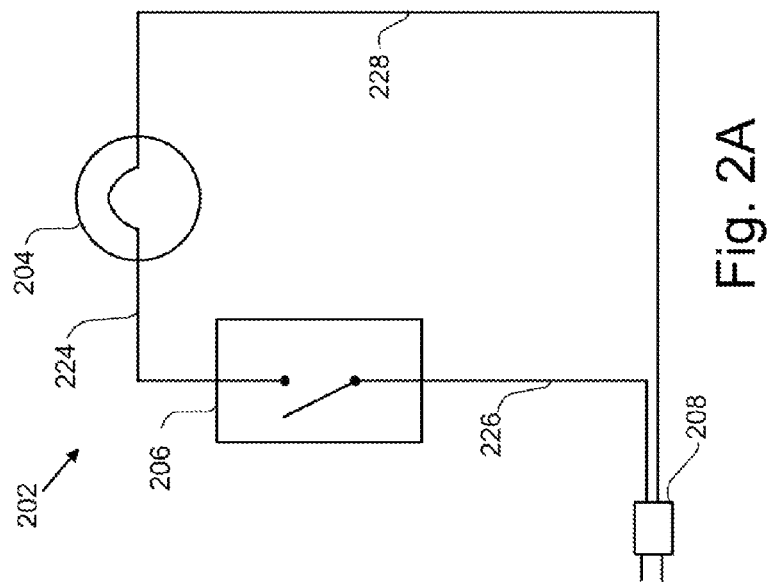
FIG. 2A is an illustrative schematic diagram of an electric lamp, according to one embodiment of the invention

The following is a list of the major elements in the drawings in numerical order.

102 lamp
104 light bulb
106 on/off switch
108 lamp plug
110 dimmer unit
112 outlet
114 on/off switch
116 on/off LED
118 dimming control
120 wireless receiver
122 dimmer unit plug
124 wire
126 wire
128 wire
202 lamp
204 light bulb
206 on/off switch
208 lamp plug
210 dimmer unit
212 outlet
214 switch
216 on/off light
218 dimming control
220 wireless receiver
222 dimmer unit plug
224 wire
226 wire
228 wire
232 lamp switch connector
234 lamp switch connector socket
236 wire
238 wire
240 wire
402 microcontroller
404 power supply
406 AC terminal block 408 controllable conductive device
502 Obtain Lamp and Dimmer Unit
504 Electrically disconnect the Switch from the Lamp
506 Electrically Connect Switch to Lamp Switch Connector
508 Electrically Connect Light Bulb to Lamp Plug
510 Connect Lamp Switch Connector to Lamp Switch Connector Socket
512 Plug Lamp Plug into Outlet
514 Plug Dimmer Unit Plug into AC Outlet

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

MODE(S) FOR CARRYING OUT THE INVENTION

Disclosed is a system and method for retrofitting an existing non-dimmable lamp with a controller that enables the lamp to be remotely dimmed and/or remotely turned on or off regardless of the state of the lamp's native on/off switch.

Referring to FIG. 1, a prior art lamp 102 and external dimmer unit 110 are shown. The lamp 102 includes a light bulb 104, an on/off switch 106, and a lamp plug 108. The light bulb 104 is in electrical communication with the switch 106 via wire 124 and in electrical communication with the lamp plug 108 via wire 128. The switch is also in electrical communication with the lamp plug 108 via wire 126.

The prior art external dimmer unit 110 includes an on/off switch 114, a dimming control 118, an on/off LED 116, a wireless receiver 120, an outlet 112, and a dimmer unit plug 122. The plug 122 is configured to plug into a standard alternating current (AC) outlet. The outlet 112 is configured to receive the lamp plug 108. The wireless receiver 120 is configured to receive commands wirelessly from a remote control by methods known to those skilled in the art. The on/off switch 114 enables or disables power from the AC outlet to the lamp 102 when the lamp 102 is plugged into the outlet 112. When the on/off switch 114 is in the "on" position, the dimmer control 118 is configured to control the current flowing to the light bulb 104.

In order for the prior art lamp-dimmer configuration to work, the dimmer unit plug 122 must be plugged into an AC outlet, the lamp plug 108 must be plugged into the outlet 112, and the switch 106 must be in a closed state. More specifically, when the switch 106 is in the closed state, the light bulb 104 receives electricity and illuminates. The amount of electricity that the light bulb 104 receives is controlled by the dimmer unit 110, either using controls on the dimmer unit 110 (e.g., switch 114, dimming control 118) or via a wireless remote control. In other words, the dimmer unit 110 controls whether the light bulb is fully on, fully off, or dimmed.

If the switch 106 is in an open state (as shown in FIG. 1), the dimmer unit 110 has no effect on the amount of current flowing to the light bulb 104 because the lamp circuit is broken at the switch 106 in the open state. This is a minor inconvenience if a user is operating the dimmer unit 110 locally (i.e., near the lamp 102). In this case, the user need only close the switch 106 so that the dimmer unit 110 can control the lamp 102. However, if the user is attempting to operate the lamp 102 via the dimmer unit 110 with a wireless remote control and the switch 106 is open, the dimmer unit 110 will not work until the switch 106 is closed. This is a significant design flaw.

Figure 2B:
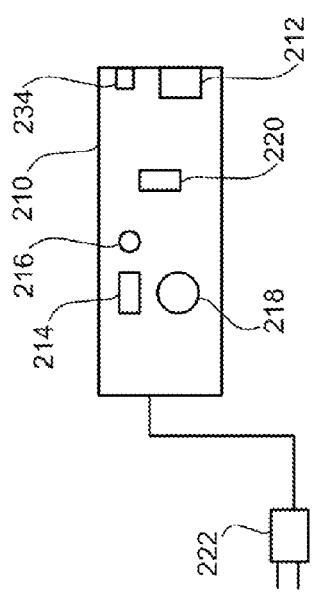
FIG. 2B is an illustrative schematic diagram of an external lamp controller, according to one embodiment of the invention.
Figure 2C:
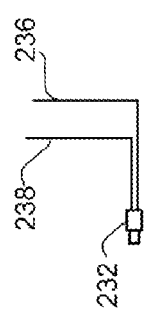
FIG. 2C is an illustrative schematic diagram of a lamp switch plug, according to one embodiment of the invention.

Referring to FIGS. 2A-2C, in one embodiment, a lamp 202, an external dimmer unit 210, and a switch connector 232 of the present disclosure are shown. The lamp 202 includes light bulb 204, switch 206, and lamp plug 208. The light bulb 204 is in electrical communication with the switch 206 via wire 224 and the lamp plug 208 via wire 228. The switch 206 is also in electrical communication with the lamp plug 208 via wire 226.

Figure 4:
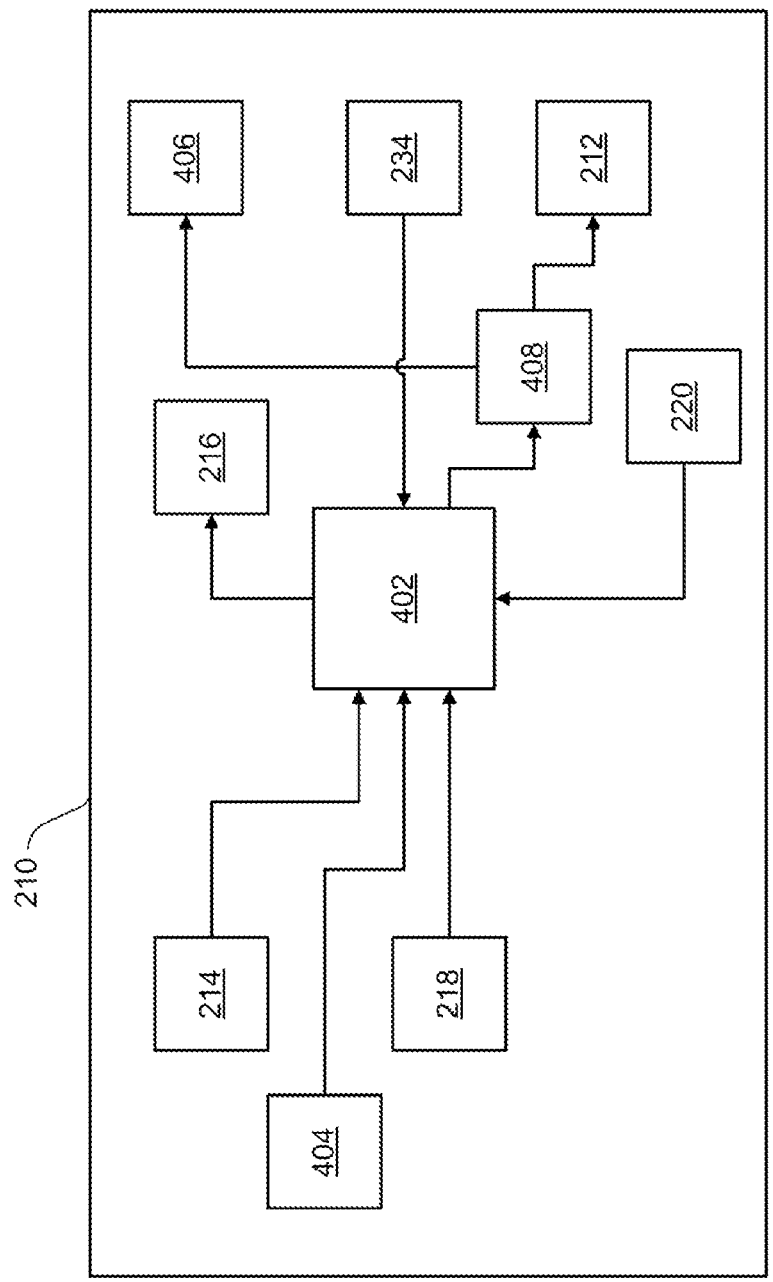
FIG. 4 is an illustrative block diagram of an external lamp controller, according to one embodiment of the invention.
Figure 5:
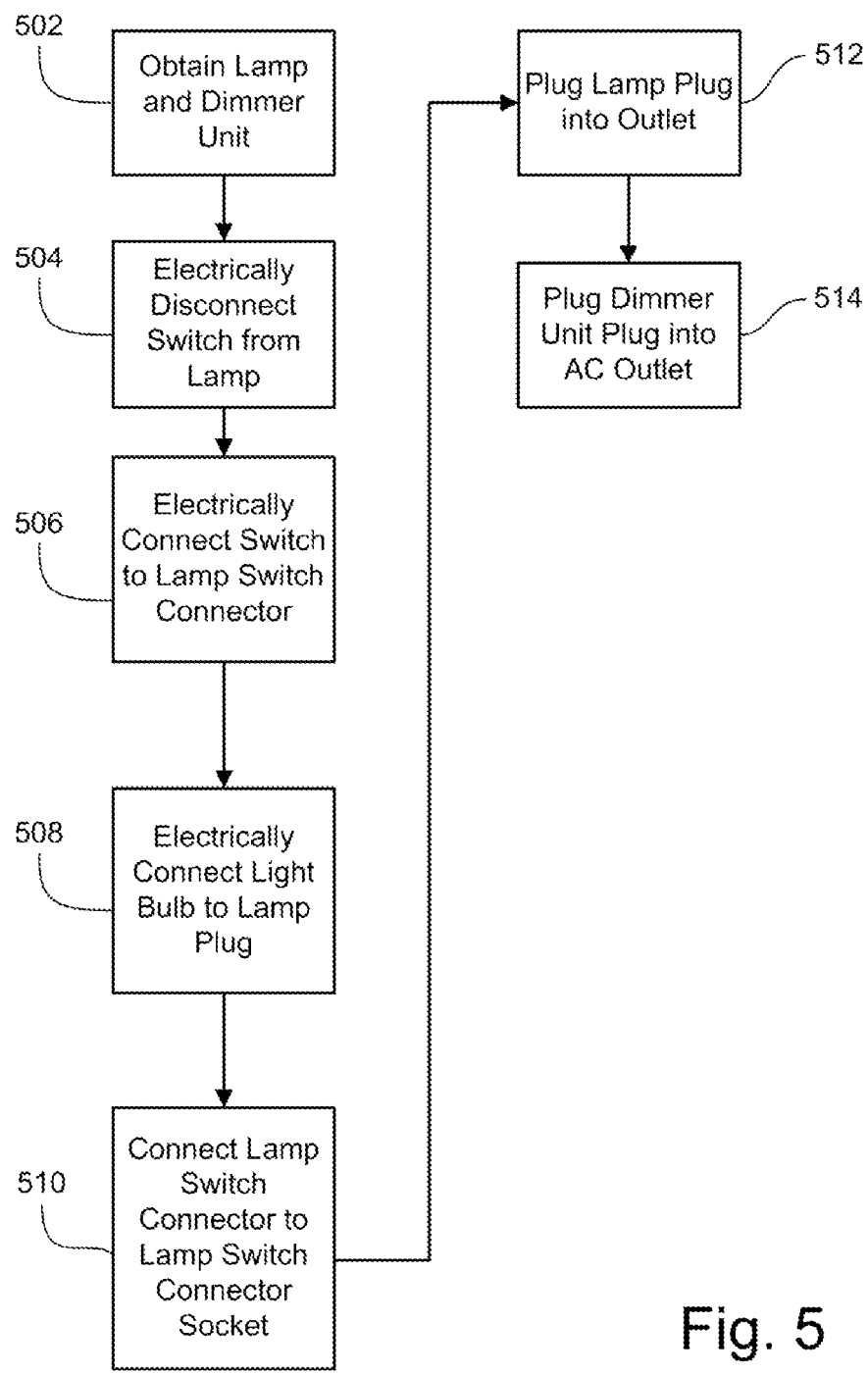
FIG. 5 is an illustrative flow diagram of method steps for retrofitting an existing lamp with an external lamp controller, according to one embodiment of the invention.

In various embodiments, the dimmer unit 210 includes an on/off switch 214, a dimmer control 218, an on/off LED 216, a wireless receiver 220, an outlet 212, a dimmer unit plug 222, a lamp switch connector socket 234, a power supply 404 (see FIG. 4), a controllable conductive device 408 (see FIG. 4), and a microcontroller 402 (see FIG. 4). In another embodiment, the dimmer unit 210 includes an AC terminal block 406. In yet other embodiments, the dimmer unit 210 includes other indicator lights and/or a liquid crystal display (LCD).

Referring to FIGS. 2A-C and 4, the on/off switch 214, the dimmer control 218, the on/off LED 216, the wireless receiver 220, the controllable conductive device 408, the lamp switch connector socket 234, and the power supply 404 are in electrical communication with the microcontroller 402. The controllable conductive device 408 is in electrical communication with the AC terminal block 406 and the outlet 212. The dimmer unit plug 222 is in electrical communication with the power supply 404 (via a standard power cord). In another embodiment, the dimmer unit 210 includes mounting holes and screws to mount the dimmer unit 210 on a wall near the lamp 202, under a table, or on the back of a cabinet to hide the dimmer unit 210 from view. In still another embodiment, the dimmer unit 210 includes brackets for mounting the dimmer unit 210 on the lamp 202.

It should be noted that all the components of the dimmer unit 210 are disposed in, or on, a housing of any shape and size that is appropriate for the physical location and proper functioning of the dimmer unit 210, as understood by those skilled in the art. In other embodiments, instead of being disposed on or in the housing, the outlet 212 and/or the lamp switch connector socket 234 are disposed on extended electrical cords. The housing also can be of any color and made of any material known to those skilled in the art.

The plug 222 of the dimmer unit 210 is configured to plug into an AC outlet. The outlet 212 is configured to receive the plug 208 from the lamp 202. The wireless receiver 220 is configured to receive commands wirelessly (e.g., RF, infrared, Bluetooth, etc.) from a remote control (e.g., hand held, wall-mounted, table top) using methods known to those skilled in the art. The wireless receiver 220 transmits the wirelessly received commands to the microcontroller 402. The on/off switch 214 enables or disables current flow from the AC outlet to the lamp 202 when the lamp 202 is plugged into the outlet 212. When the on/off switch 214 is in the "on" position, the dimmer control 218 is configured to control/vary the current flowing to the light bulb 204. The lamp switch connector socket 234 is configured to receive (connect to) the lamp switch connector 232. In another embodiment, instead of using the outlet 212, the plug 208 is removed from the power cord of the lamp 202 and the power cord is wired (electrically connected) directly to the AC terminal block 406. In still another embodiment, the dimmer unit 210 is controlled/operated via only the wireless receiver 220, which is in wireless communication with, and receives commands from, a home automation system or a remote control.

Referring to FIG. 3, in contrast to the prior art lamp and dimmer unit of FIG. 1, in one embodiment, the lamp 202 retrofit with the dimmer unit 210 is shown. In this embodiment, the switch 206 is functionally isolated from (i.e., no longer in electrical communication with) the lamp bulb 204 and functionally connected to (in electrical communication with) the dimmer unit 210 via the lamp switch connector 232, which plugs into (connects with) the lamp switch connector socket 234. The lamp bulb 204 is in electrical communication with the lamp plug 208, which is plugged into the socket 212. The dimmer unit plug 222 is plugged into an AC outlet (not shown).

The current flow to the light bulb 204 is controlled by the controllable conductive device 408, which is controlled by the microcontroller 402. In various embodiments, the controllable conductive device 408 is an autotransformer, a relay switch, a MOSFET, or any other device(s) known to those skilled in the art. The microcontroller 402 receives control signals from either the on/off switch 214, the dimming control 214, the wireless receiver 220, or the switch 206, which, as described above, is in electrical communication with the microcontroller 402 (rather than the light bulb 204) via the lamp switch connector 232 and the lamp switch connector socket 234.

In operation, in one embodiment, assuming the lamp switch 206 is in a closed state (i.e., switched to an "on" state), a user has the option of using the dimmer unit 210 to locally turn the lamp on or off via the switch 214, dim the lamp via the dimming control 218, or remotely control/operate (i.e., dim, turn on/off) the lamp via a remote control or home automation system in wireless communication with the wireless receiver 220.

The user can also choose to turn the lamp 202 off with the lamp switch 206. However, because the switch 206 is functionally isolated from the lamp 202 (i.e., electrically disconnected from the light bulb 204) and functionally connected to the microcontroller 402 (i.e., in electrical communication with the microcontroller 402), the switch 206 no longer breaks the light bulb 204 lighting circuit independent of the dimmer unit 210. Instead, the microcontroller 402 interprets the actuation of the switch 206 as a toggle signal and, in response thereto, toggles the light bulb 204 (by controlling the controllable conductive device 408) from a current state (e.g., "on") to a next state (e.g., "off"). Since the light bulb 204 state (i.e., "on" or "off") is exclusively controlled by the microcontroller 402 and the controllable conductive device 408, a user can still control the lamp 202 remotely after the switch 206 has been switched off.

Similarly, if the lamp 202 has been switched off either remotely or via the switch 214, a user can choose to switch the lamp 202 on using the switch 206. Again, the microcontroller 402 interprets the actuation of the switch 206 as a toggle signal and, in response thereto, toggles the light bulb 204 (by controlling the controllable conductive device 408) from a current state (e.g., "off") to a next state (e.g., "on").

In other words, regardless of the state of the lamp 202 (on or off) and regardless of the state of the switch 206 (open or closed), a user can still operate the lamp remotely since all lamp control is effectuated by the microcontroller 402 and the controllable conductive device 408.

In another embodiment, the microcontroller is replaced by an analog dimmer and sensing circuitry. The analog dimmer and the sensing circuitry are in electrical communication with the controllable conductive device. The sensing circuitry is also in electrical communication with lamp switch connector socket and interprets the actuation of the lamp switch as a toggle signal and, in response thereto, toggles the light bulb by controlling the controllable conductive device 408 from a current state to a next state, a described in detail above.

Referring to FIGS. 2A-C, 3, and 5, the steps for retrofitting the lamp 202 with the dimmer unit 210 are described below.

After selecting an appropriate lamp 202 (i.e., a lamp that includes a single pole, single throw switch) and obtaining a dimmer unit, such as dimmer unit 210 (Step 502), the wires 206 and 226 are electrically disconnected from the switch 206, thereby functionally isolating the switch 206 from the lamp 202 (Step 504). In other words, the electric switch 206 remains mechanically connected to the lamp 202. The wires 236 and 233 are then connected to the switch 206 thereby electrically connecting the switch 206 to the lamp switch connector 232 (see FIG. 3) (Step 506). Next, the light bulb 204 is connected via the wire 240 to the contact of the lamp plug 208 previously connected to the switch 206 (see FIG. 3) (Step 508). The connection (via wire 228) between the light bulb 204 and other contact of the lamp plug 208 is maintained. Next, the lamp switch connector 233 is electrically connected (plugged in) to the lamp switch connector socket 234, thereby electrically connecting the electric switch 206 to the microcontroller 402 (Step 510). Thereafter, the lamp plug 208 is plugged into the outlet 212 (Step 512), and the dimmer unit plug 222 is plugged into an AC outlet (Step 514). The lamp 202 can thereafter be operated and controlled remotely regardless of the state of the switch 206.

LIST OF ACRONYMS USED IN THE DETAILED DESCRIPTION OF THE INVENTION

The following is a list of the acronyms used in the specification in alphabetical order.
AC alternating current
LCD liquid crystal display
LED light emitting diode
MOSFET metal oxide silicon field effect transistor
RF radio frequency

ALTERNATE EMBODIMENTS

Variations, modifications, and other implementations of what is described herein may occur to those of ordinary skill in the art without departing from the spirit and scope of the invention. Accordingly, the invention is not to be defined exclusively by the preceding illustrative description.

What is claimed is:

1. A method for retrofitting an electric lamp having an electric switch with a dimmer unit, the method comprising:
    providing a dimmer unit configured for dimming the electric lamp, the dimmer unit comprising:
        a microcontroller, and
        a lamp switch connector socket in electrical communication with the microcontroller;
    providing a lamp switch connector;
    electrically disconnecting the electric switch from the electric lamp;
    electrically connecting the electric switch to the lamp switch connector; and
    electrically connecting the lamp switch connector to the lamp switch connector socket thereby functionally isolating the electric switch from the lamp and electrically connecting the electric switch to the microcontroller.

2. The method of claim 1, further comprising plugging a plug of the electric lamp into the dimmer unit.

3. The method of claim 2, further comprising plugging a plug of the dimmer unit into an AC outlet.

4. The method of claim 1, wherein the microcontroller is configured to toggle the lamp to one of an on state or an off state in response to the electric switch being actuated by a user.

5. The method of claim 1, wherein the dimmer unit further comprises a wireless receiver in communication with the microcontroller, the wireless receiver being configured to receive a command wirelessly and transmit the command to the microcontroller.

6. The method of claim 5, wherein the microcontroller is further configured to toggle the lamp to one of an on state or an off state in response to the wireless command regardless of the state of the electric switch.

7. The system of claim 1, wherein the dimmer unit further comprises an on/off switch and the microcontroller is further configured to toggle the lamp to one of an on state or an off state in response to actuation of the on/off switch regardless of the state of the electric switch.

8. The method of claim 1, further comprising mounting the dimmer unit onto the lamp.

9. The method of claim 1, wherein the electric lamp comprises a power cord and plug electrically connected to the power cord.

10. The method of claim 9, further comprising removing the plug from the power cord and electrically connecting the power cord to a power supply disposed in the dimmer unit.

11. A system for retrofitting an electric lamp having an electric switch with a dimmer unit, the system comprising:
   a dimmer unit configured for dimming the electric lamp, the dimmer unit comprising:
      a microcontroller, and
      a lamp switch connector socket in electrical communication with the microcontroller; and
      a lamp switch connector configured for electrically connecting to the lamp switch connector socket and electrically connecting to the electric switch, and thereby functionally isolating the electric switch from the lamp and electrically connecting the electric switch to the microcontroller.

12. The system of claim 11, wherein the dimmer unit further comprises a wireless receiver in communication with the microcontroller, the wireless receiver being configured to receive a command wirelessly and transmit the command to the microcontroller.

13. The system of claim 12, wherein the microcontroller is further configured to toggle the lamp to one of an on state or an off state in response to the command received by the wireless receiver regardless of the state of the electric switch.

14. The system of claim 11, wherein the microcontroller is configured to toggle the lamp to one of an on state or an off state in response to the electric switch being actuated by a user.

15. The system of claim 11, wherein the dimmer unit further comprises an on/off switch and the microcontroller is further configured to toggle the lamp to one of an on state or an off state in response to actuation of the on/off switch regardless of the state of the electric switch.

16. The system of claim 11, wherein the dimmer unit further comprises a dimmer control, and an outlet configured to receive a plug of the electric lamp.

17. The system of claim 11, wherein the dimmer unit further comprises AC terminal connectors configured to electrically connect to a power cord of the electric lamp.

* * * * *